T. T. VERNON.
METHOD OF TREATING FLOUR AND PRODUCT THEREOF.
APPLICATION FILED FEB. 11, 1915.
1,155,977. Patented Oct. 5, 1915.
5 SHEETS—SHEET 3.
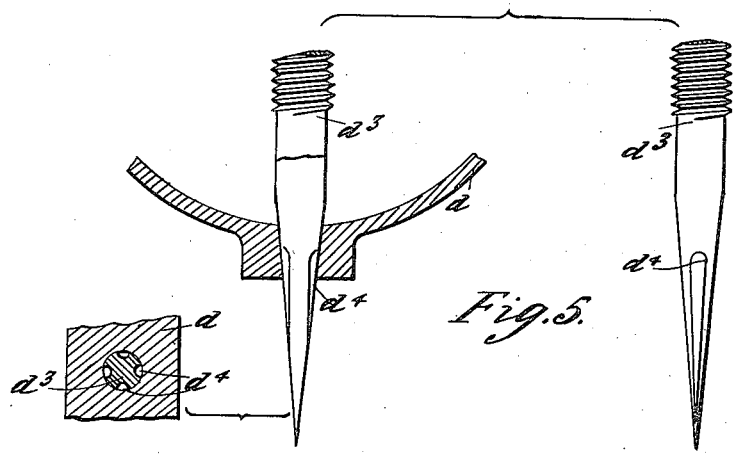
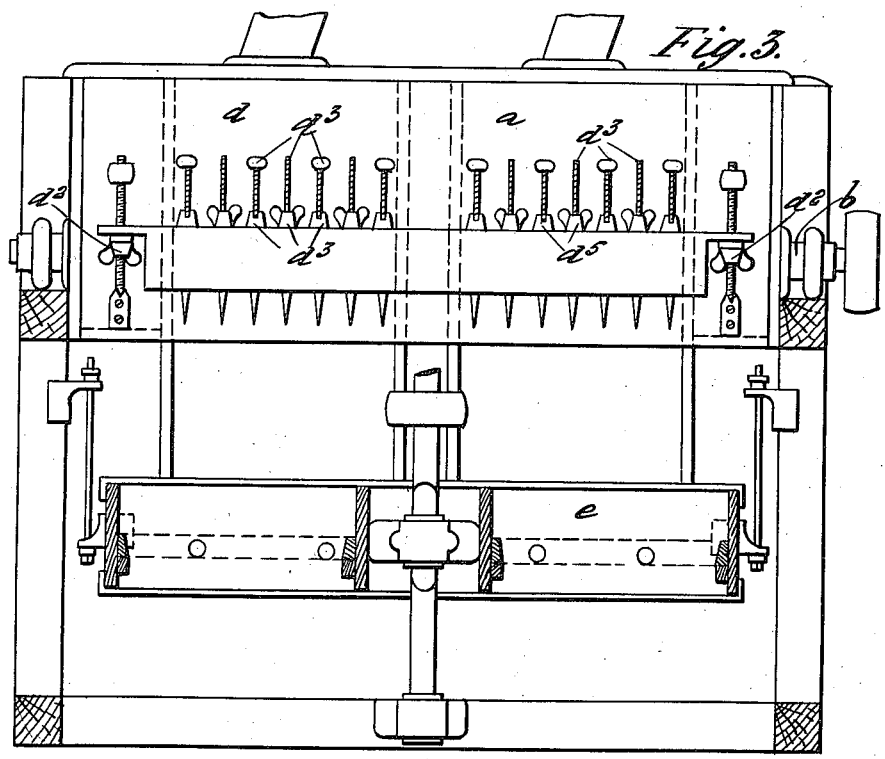

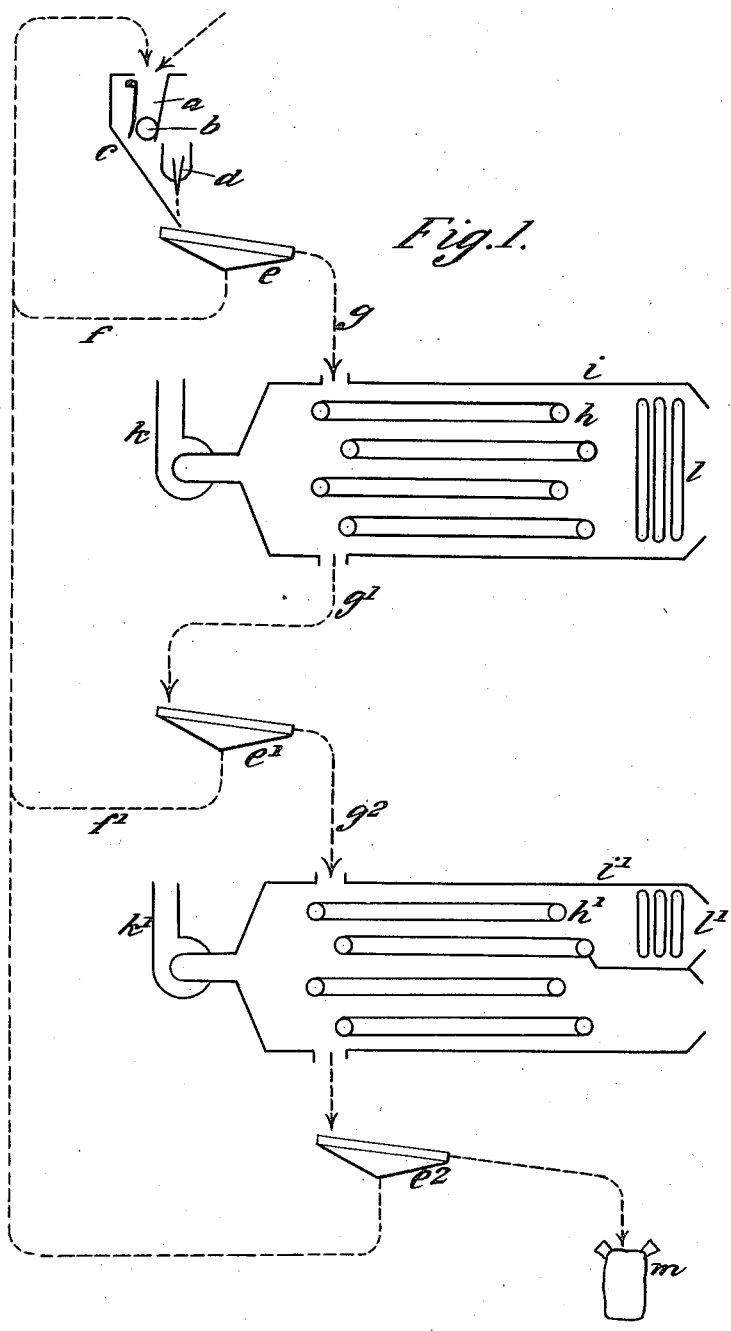

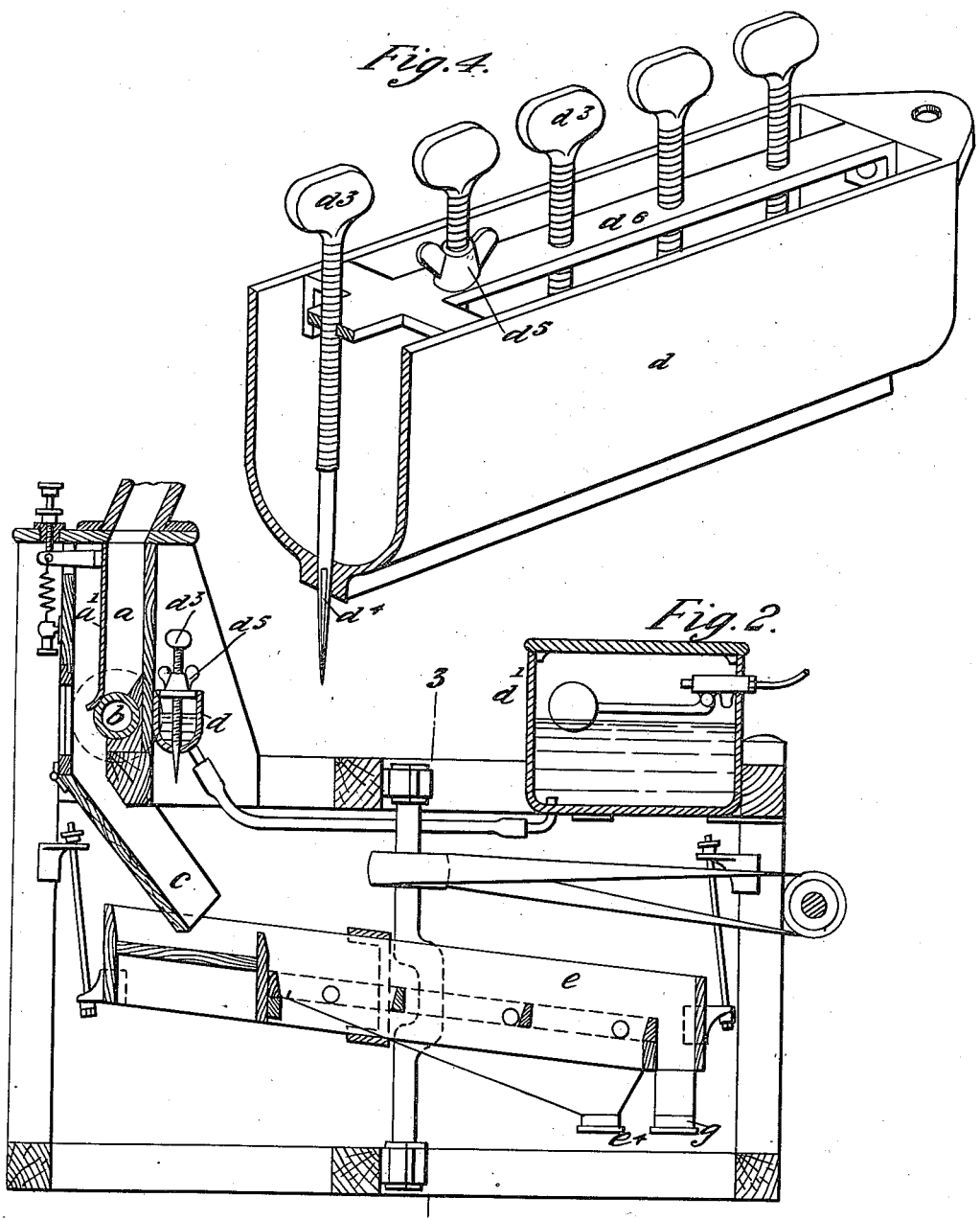

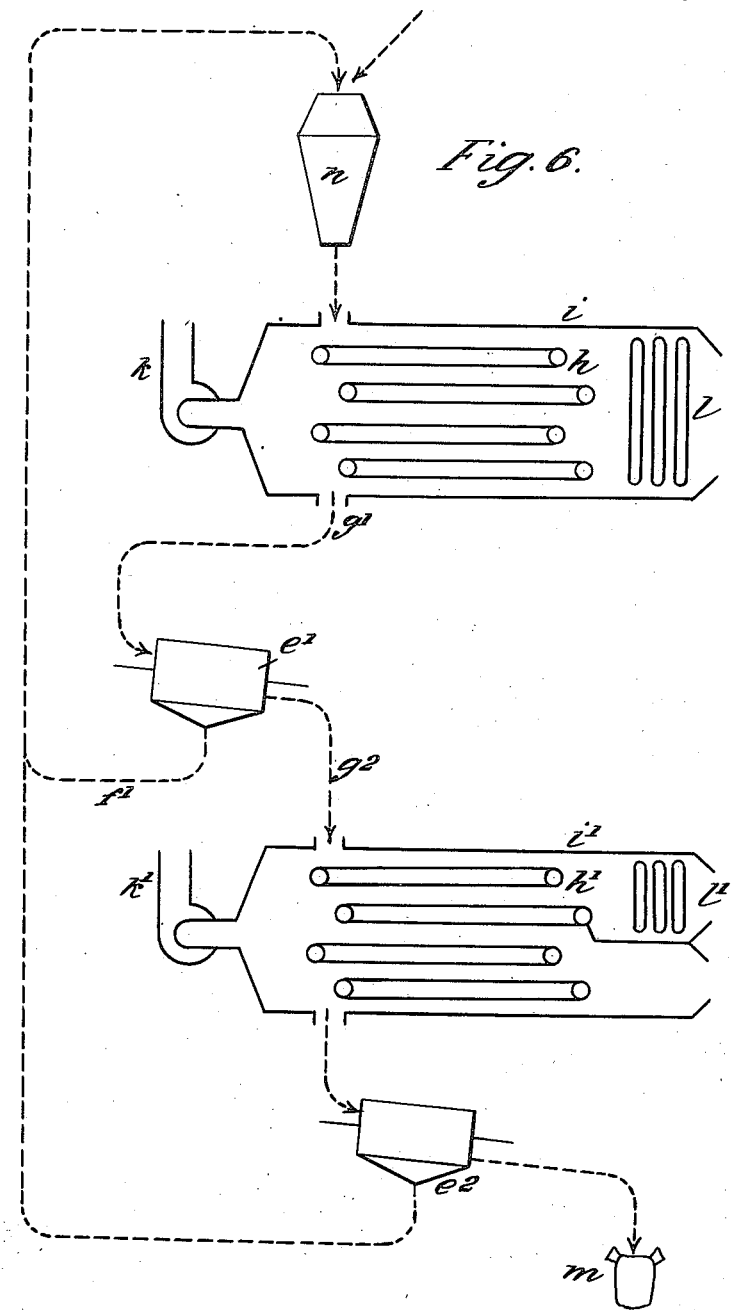

T. T. VERNON.
METHOD OF TREATING FLOUR AND PRODUCT THEREOF.
APPLICATION FILED FEB. 11, 1915.
1,155,977.
Patented Oct. 5, 1915.
5 SHEETS—SHEET 5.
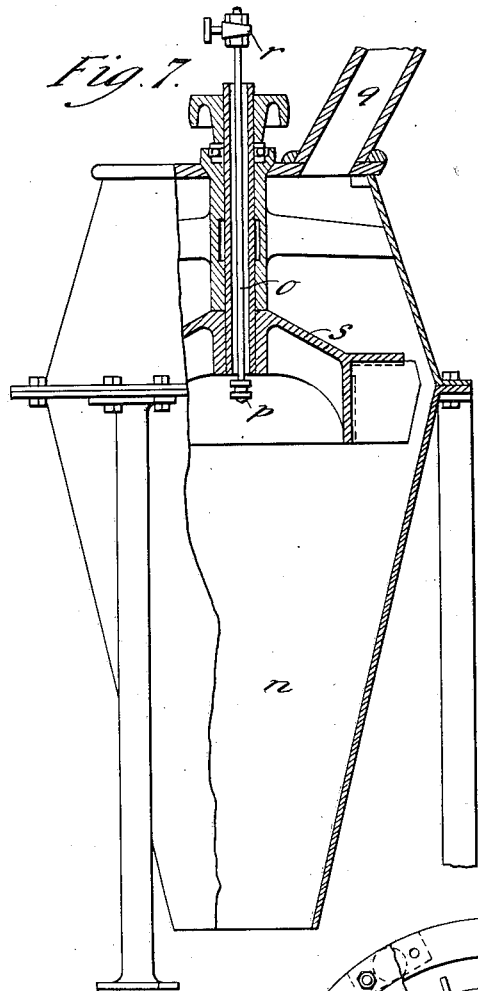
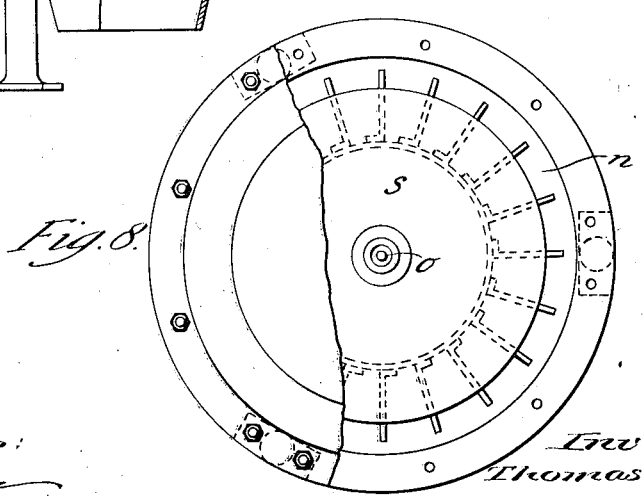

UNITED STATES PATENT OFFICE.

THOMAS THORNYCROFT VERNON, OF CHESTER, ENGLAND.

METHOD OF TREATING FLOUR AND PRODUCT THEREOF.

1,155,977.     Specification of Letters Patent.     Patented Oct. 5, 1915.

Application filed February 11, 1915. Serial No. 7,656.

*To all whom it may concern:*

Be it known that I, THOMAS THORNYCROFT VERNON, a subject of the King of Great Britain, residing in Chester, England, have invented a certain new and useful Method of Treating Flour and Product Thereof, of which the following is a specification.

A known method of making a coarse grained cereal flour consists in first making a paste or dough of the flour by adding water in the usual way or by heating the moistened flour to a temperature high enough to gelatinize the starch, subdividing this paste or dough to the required degree of fineness and drying, if necessary, the subdivided paste or dough. The product has lost most of the characteristics of flour since it has passed through the stage of paste or dough.

My invention relates to the manufacture of coarse grained cereal products such as flour, Indian corn flour, oatmeal flour, or intermediate products or by-products of the flour mills, which differ from the known products in that they consist of coarse grains formed by aggregates of fine grained particles which have not been made into a paste or dough.

The manufacturer takes advantage of the known fact that drops of liquid brought into contact with dusty material become coated therewith. When the liquid is capable of evaporation and becomes dissipated the dust is left in a condition of aggregates of the original particles. I have discovered that such aggregates of flour are particularly suitable for making bread and cakes owing to the ease with which they can be mixed with water, to the readiness with which the grains are disintegrated by the water and to the fact that the operation of drying out the water has conditioned the flour without the drastic alterations produced in drying a paste or dough.

The new product is made by bringing drops of water of suitable size, containing, if desired dissolved or suspended matter, into direct contact with a stream of the cereal flour, so that the drops are immediately surrounded with flour, thereby forming spherical masses, consisting of flour and water, the size of which depends on the size of the drops. These masses are then dried, the duration and temperature of the drying operation depending on whether it is desired to effect certain changes in the flour by treatments which are commonly known as conditioning or maturing.

The spraying of flour with water and with water containing substances in solution or suspension, is a known operation, a very fine spray being used for the purpose of avoiding as far as possible the formation of small agglomerations of particles of flour which are apt to be produced accidentally; when such small agglomerations are formed they are sifted from the flour and returned to the mill. It has not been realized, however, that aggregations of flour formed by drops of water may be conditioned and dried so as to constitute a valuable product.

As already stated, the water may contain matter dissolved or suspended in it, and such matter may remain in the dried aggregates. For instance, milk may be used, with obvious advantages; or material may be introduced which would not be permissible in normal flour; thus suitable ferments, such as yeast, may be added to the water drops. Again, by using a solution of an acid like tartaric acid in treating one portion of flour, and a solution of a carbonate in treating another portion of flour, the two dried coarse grained flours may be mixed to form a self-raising flour with improved keeping properties.

The accompanying drawings illustrate two forms of the apparatus suitable for making the aggregates.

Figure 1 is a diagram of a plant in which the aggregates are formed by water dropped from a number of points on to the stream of flour; Fig. 2 is a vertical section in a plane transverse to the water trough from which the drops fall; Fig. 3 is a section on line 3—3 of Fig. 2 and Figs. 4 and 5 show details drawn to an enlarged scale. Fig. 6 is a diagram of a plant wherein a layer of flour into which the water drops are projected is produced on the inner surface of a cone by means of a fan; Fig. 7 is a sectional elevation and Fig. 8 a sectional plan of the cone and fan.

Referring to Fig. 1, the flour is delivered from a hopper $a$ by a revolving roller $b$ on to an inclined plane $c$ where it receives drops of water from points projecting through perforations in the bottom of a trough $d$. The flour containing the aggregates formed by these drops is received by the sieve $e$ the mesh of which depends on the size of the water drops and therefore of the aggregates. In the present instance the drops are fairly large so that the coarse grains produced are correspondingly large. The flour which passes through the sieve is returned by a conveyer $f$ to the hopper $a$ while the aggregates pass down a chute $g$ on to the uppermost of a number of endless, traveling bands $h$ contained in a casing $i$, exhausted at one end by a fan $k$ and containing steam pipes $l$ at the other end to heat the air drawn by the fan into the casing and over the bands. The aggregates fall from the top band to that next beneath it, which travels in the opposite direction and discharges the aggregates on to the next lower band and so on until the aggregates and the finer flour which accompanies them are delivered through a chute $g'$ on to a second sieve $e'$. As before, the material which passes through the sieve is carried by a conveyer $f'$ back to the chute $a$ while the aggregates pass down chute $g^2$ on to the traveling band $h'$ in the casing $i''$. The latter is shown as constituting a conditioning chamber as to its upper half, the air drawn in being heated by steam pipes $l'$ and a cooling chamber as to its lower half. When discharged from this casing the aggregates receive a final sifting on sieve $e^2$ and are delivered into sacks $m$.

The length of the bands $h$, $h'$, the speed of their travel and the temperature of the air drawn over them, depend on the nature of the flour under treatment, the degree of conditioning desired and the size of the aggregates. A temperature of 100–130° F. generally suffices if the sojourn of the aggregates on the bands is of considerable duration; otherwise a temperature of 130–140° F. is desirable. As an aid to the conditioning the water drops may have a temperature of say 130° F. as they fall upon the flour.

The construction shown in Figs. 2 and 3 shows hopper $a$ closed at bottom by a revolving roller $b$ which delivers the flour in quantity regulated by an adjustable flap $a'$, on to the inclined plane $c$ as already stated. The water trough $d$ is kept filled to a substantially constant level from a supply cistern $d'$ and is adjustable in height, to vary the force with which the drops strike the flour, by means of nuts $d^2$ working on fixed spindles and on which the trough is supported. A bar $d^6$ fixed in the trough (Fig. 4) has perforations to receive the pointed screws $d^3$ the points of which are preferably of wood and extend through perforations in the bottom of the trough and are provided with channels $d^4$. The rate of flow of the water through the perforations in the bottom of the trough and down the channels in the points, and therefore the size of the drops, depends on the position of the point in the perforation as determined by the nuts $d^5$ which support the screws on the bar $d^6$. The flour descending the inclined plane $c$ is received on a well-known form of rotary or vibrating sieve $e$ which does not need further description; the flour leaves the sieve by chute $e^4$ and the aggregates by chute $g$.

Referring to Figs. 6, 7 and 8, $s$ is a fan which rotates in the cone $n$ as will be obvious. Through the tubular spindle of the fan extends a water pipe $o$ having at its lower end a nozzle or sprinkler $p$ of a well known kind adapted to spread laterally and deliver water with a gyratory motion, so that the water breaks up into drops which are projected in lateral directions or toward the sides of the cone $n$. The flour descends chute $q$ on to the upper surface of the fan which at once sets it into gyratory movement so that it forms a continually descending layer on the inner surface of the cone. Here it receives the water drops scattered by the nozzle $p$, the size of the drops being controlled in known manner by varying the rate of discharge by adjusting cock $r$. The mixed flour and aggregates leaving the cone may be received on traveling bands as already described and as represented in the diagram Fig. 6, in which the parts that are lettered as in Fig. 1, have the functions ascribed to them in relation to that figure.

Having now described the nature of the said invention and the best means I know of carrying the same into practical effect, I claim:—

1. As a new article of manufacture, a coarse grained cereal flour or the like consisting of dry aggregates of fine grained particles of such flour.

2. A flour for making bread or cakes consisting of conditioned and dried aggregates of particles of flour.

3. The hereindescribed method of making a coarse grained cereal product, which comprises coating drops of water with fine grained particles of a cereal product, and drying the same to aggregate the fine grained particles into coarse grains.

4. The hereindescribed method of making a coarse grained cereal product composed of dried aggregates, which comprises bringing drops of water into contact with finely ground cereal or cereal product, and then drying the aggregates thus produced.

5. The hereindescribed method of making coarse grained cereal flour or the like, which comprises bringing drops of water into contact with the flour or the like, and conditioning and drying the aggregates thus formed.

6. The hereindescribed method of making coarse grained cereal products, which comprises supplying the flour or the like to a surface on which it forms a moving layer, causing drops of water to fall upon such layer, sifting the aggregates thus formed from the unaltered flour, and returning the latter to the surface for further treatment until substantially the whole of the flour has become aggregates, substantially as described.

In testimony whereof I have signed my name to this specification in the presence of two subscribing witnesses.

THOMAS THORNYCROFT VERNON.

Witnesses:
J. H. ALLEN,
A. M. MILLER.